(12) United States Patent
Gage

(10) Patent No.: US 7,055,810 B2
(45) Date of Patent: Jun. 6, 2006

(54) EXPANSION RING FOR MASS TRANSFER COLUMN AND METHOD EMPLOYING SAME

(75) Inventor: Gary W. Gage, Grand Prairie, TX (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 10/829,034

(22) Filed: Apr. 21, 2004

(65) Prior Publication Data

US 2004/0212106 A1 Oct. 28, 2004

Related U.S. Application Data

(60) Provisional application No. 60/464,467, filed on Apr. 22, 2003.

(51) Int. Cl.
*B01F 3/04* (2006.01)
(52) U.S. Cl. .................................. 261/114.1; 261/114.5
(58) Field of Classification Search ............. 261/114.1, 261/114.2, 114.3, 114.4, 114.5; 202/158; 203/71
See application file for complete search history.

(56) References Cited

U.S. PATENT DOCUMENTS

| 2,807,451 | A | | 9/1957 | Kuhni et al. | |
| 2,889,018 | A | | 6/1959 | Swan | |
| 3,094,575 | A | * | 6/1963 | Peterson | ................... 261/114.1 |
| 3,243,171 | A | * | 3/1966 | Eckert | ........................... 261/97 |
| 3,926,741 | A | * | 12/1975 | Bertsch | ....................... 202/269 |
| 3,928,513 | A | * | 12/1975 | Leva | ............................ 261/113 |
| 4,075,298 | A | * | 2/1978 | Leva et al. | ............... 261/114.5 |
| 4,369,150 | A | | 1/1983 | Harper | |
| 5,547,617 | A | | 8/1996 | Lee et al. | |

FOREIGN PATENT DOCUMENTS

FR  2485143  12/1981

* cited by examiner

*Primary Examiner*—Scott Bushey
(74) *Attorney, Agent, or Firm*—J. David Wharton; Stinson Morrison Hecker LLP

(57) ABSTRACT

A mass transfer column (10) is provided with at least one vapor-liquid contact tray (12) that is disposed within the open internal region (14) defined by a shell (16) of the column (10). At least one expansion ring (26) underlies and supports the vapor-liquid contact tray (12). An expander (38) is associated with first and second end segments (32, 34) of the expansion ring (26) that define a cutout (36) in the expansion ring (26). The expander (38) includes brackets (48) welded to the end segments (32, 34) and a threaded member (50) that extends through the brackets (48) and carries nuts (54). Turning the nuts (54) against facing surfaces of the brackets (48) causes the first and second end segments (32, 34) of the expansion ring (26) to be forced apart to cause an increase in the circumference of the expansion ring (26), thereby sealing the expansion ring (26) against the inner surface of the column shell. At least one seal plate (58) is positioned on the threaded member (50) to block the cutout (36) in the expansion ring (26) Rods (27) extend between the expansion ring (26) and a support ring (24) that is welded to the column shell (16) to transfer a portion of the load carried by the expansion ring (26) to the support ring (24).

19 Claims, 2 Drawing Sheets

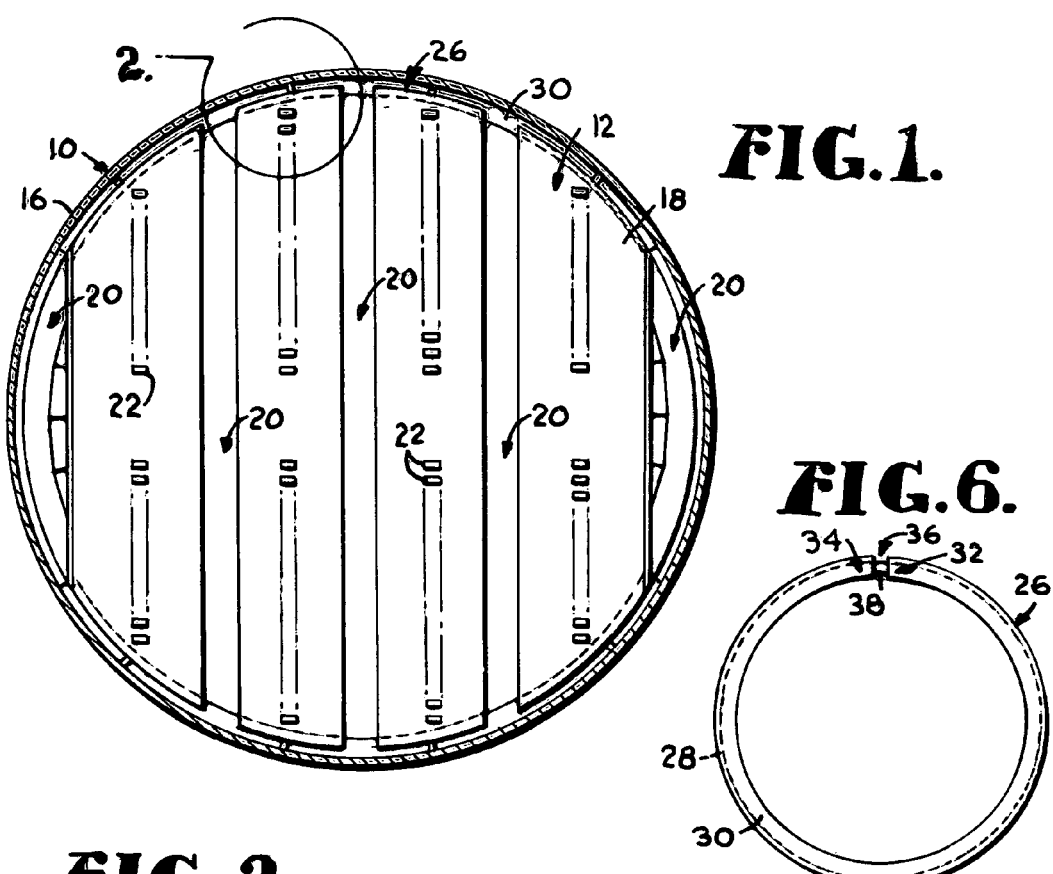
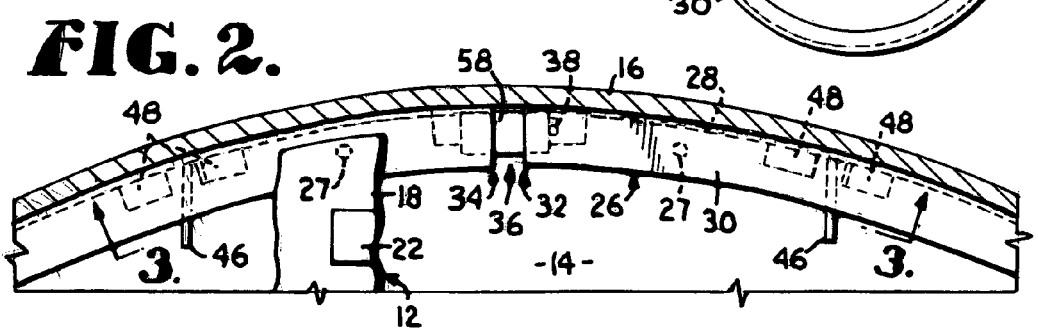
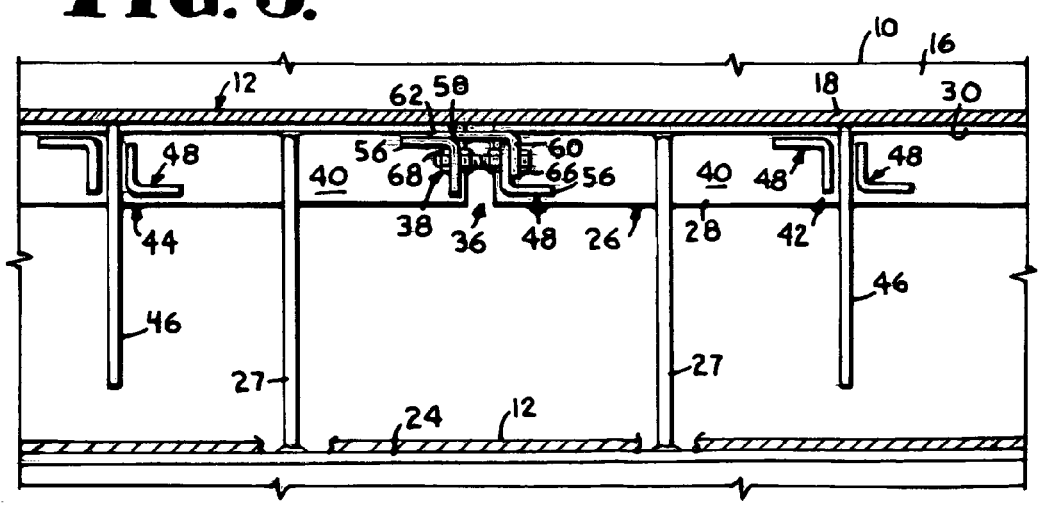

EXPANSION RING FOR MASS TRANSFER COLUMN AND METHOD EMPLOYING SAME

CROSS-REFERENCE TO RELATED APPLICATION

This application claims the benefit of provisional application Ser. No. 60/464,467, filed Apr. 22, 2003.

BACKGROUND OF THE INVENTION

This invention relates generally to mass transfer columns and, more particularly, to an apparatus and method for supporting and sealing trays within such columns.

Mass transfer columns, including heat exchange columns, typically include an upright shell and a plurality of horizontally disposed trays that are positioned within the shell and are used to facilitate mass or heat transfer between fluid streams flowing within the column. The fluid streams are normally one or more downwardly flowing liquid streams and one or more ascending vapor streams, although other combinations of fluid streams are possible. Each tray includes a plurality of vapor passages that allow the vapor stream to ascend through the tray for interaction with the liquid stream flowing across an upper surface of the tray. A plurality of such trays are normally supported in vertically spaced relationship by support rings that are welded to the inner surface of the shell and underlie the outer peripheral edge portion of the trays.

During revamping of mass transfer columns, it is often necessary to change the vertical spacing between successive trays. Considerable time and effort, however, is normally required to remove the existing support rings and weld new support rings at the desired location on the column shell. In addition, the process of cutting out the old support rings and welding new support rings may be hazardous if combustible fluids or residues are still present in the column or if the structural integrity of the column shell is weakened or otherwise negatively affected by the cutting and welding. Post-revamp stress relieving and pressure testing of the column may be necessary to ensure that the column remains safe for use after replacement of the support ring. This post-revamp stress relieving and pressure testing of the column further adds to the costs and delays associated with replacing the support rings in revamped columns.

In order to reduce the number of support rings that must be welded to the column shell in revamped as well as new columns, it is known to use support rings that are welded to the column shell to support one or more vertically adjacent support rings that are not welded to the column shell. Vertical rods known as pedestals extend upwardly from the welded support rings to position and support the overlying support rings that are not welded to the column shell. The support rings that are supported in this manner are known as expansion or floating or surrogate support rings and their use can greatly reduce the time and effort required to install the support rings within the column.

One problem resulting from the use of these floating or surrogate support rings is the difficulty in obtaining a fluid-tight seal between the support ring and the column shell. While some leakage between the support ring and column shell is acceptable, an out-of-round column shell or support ring may cause an unacceptable level of fluid leakage that materially affects the performance of the column. One approach to minimizing this gap has been to use a floating or surrogate support ring that can be expanded in circumference. These expandable support rings are commonly known as expansion rings and are constructed as one or more incomplete ring segments. A 90° flange extends radially from one end of the ring segment and an overlapping 90° flange extends downwardly from a top edge of the adjacent end of the ring segment. The overlapping 90° flange has a horizontal segment and a downwardly extending segment. The horizontal segment is of a preselected length to space the downwardly extending segment a preselected distance from the end of the associated ring segment. A bolt extends through the overlapping portions of the two 90° flanges and, when a nut is tightened on the bolt against an opposite face of one of the flanges, the flanges are brought closer to each other to cause an expansion in the circumference of the ring segment.

One problem associated with the design of the expansion ring described above is the flanges may deform from their 90° orientation as the nut is tightened to cause expansion of the rings. This deformation of the flanges limits the amount that the ring can be expanded to seal against the inner surface of the column shell. While the flanges can be formed of thicker gauge material to resist such deformation, the use of lighter gauge material is generally preferred because it is easier to carry into the column during installation. The use of thicker material for the flanges is also problematic because a source for such material may not be readily available. When the expansion ring described above is formed from two or more ring segments, each segment has only one correct orientation and the installer must pay careful attention to the order in which the segments are installed to ensure that the expansion ring is assembled correctly.

A need has thus arisen for an expansion ring that can be expanded to form a tighter seal against the column shell than can normally be achieved with conventional expansion rings. A need has also arisen for an expansion ring that can offers a wide range of movement from the initial installation to the fully expanded position without allowing large quantities of fluid to flow through the gap between the ends of the ring or ring segments. A need has also arisen for an expansion ring having multiple ring segments that can be assembled together in more than one arrangement to facilitate assembly of the expansion ring.

SUMMARY OF THE INVENTION

In one aspect, the present invention is directed to an expansion ring for use in a mass transfer column having an external shell that defines an open internal region within the column. The expansion ring underlies and supports a vapor-liquid contact tray disposed within the internal region of the column. The expansion ring comprises a vertical leg and a tray support flange that extends radially inwardly from an upper edge of the vertical leg. The expansion ring has a first end segment and a second end segment defining an opening or cutout in both the vertical leg and tray support flange portions of the expansion ring. An expander is associated with the first and second end segments of the expansion ring. The expander forces the first and second end segments apart to cause an increase in the circumference of the expansion ring, thereby sealing the expansion ring against an inner surface of the column shell. A seal plate is positioned such that it blocks the cutout in the expansion ring. A support ring secured to the column shell is positioned above or below the expansion ring and vertical pedestals extend between the support ring and the expansion ring to transfer the load carried by the expansion ring to the support ring.

The expander comprises a first bracket secured to the first end segment of the expansion ring and a second bracket secured to the second end segment, a threaded member extending through the first and second brackets, and a pair of nuts carried on said threaded member. The nuts are separately turnable against the first and second brackets to force them further apart and thereby cause the expansion ring to expand against the inner surface of the column shell. The first and second brackets are preferably welded to the vertical leg portion of the expansion ring and the seal plate is preferably positionable on the threaded member to block the cutout in the tray support flange of the expansion ring.

In another aspect, the invention is directed to a method of supporting the vapor-liquid contact tray using the expansion ring described above.

BRIEF DESCRIPTION OF THE SEVERAL VIEWS OF THE DRAWINGS

In the accompanying drawings which form part of the specification and are to be read in conjunction therewith and in which like reference numerals are used to indicate like parts in the various views:

FIG. 1 is top plan view of a mass transfer column taken in horizontal section to show a vapor-liquid contact tray supported on an expansion ring constructed in accordance with the present invention;

FIG. 2 is a fragmentary top plan view of the column taken on an enlarged scale from that shown in FIG. 1 and with portions of the contact tray being broken away to better illustrate the under underlying expansion ring;

FIG. 3 is a fragmentary side elevation view of the column taken in vertical section along line 3—3 of FIG. 2 in the direction of the arrows;

FIG. 6 is a top plan view of an expansion ring constructed in accordance with the present invention.

DETAILED DESCRIPTION OF THE INVENTION

Figure 4:
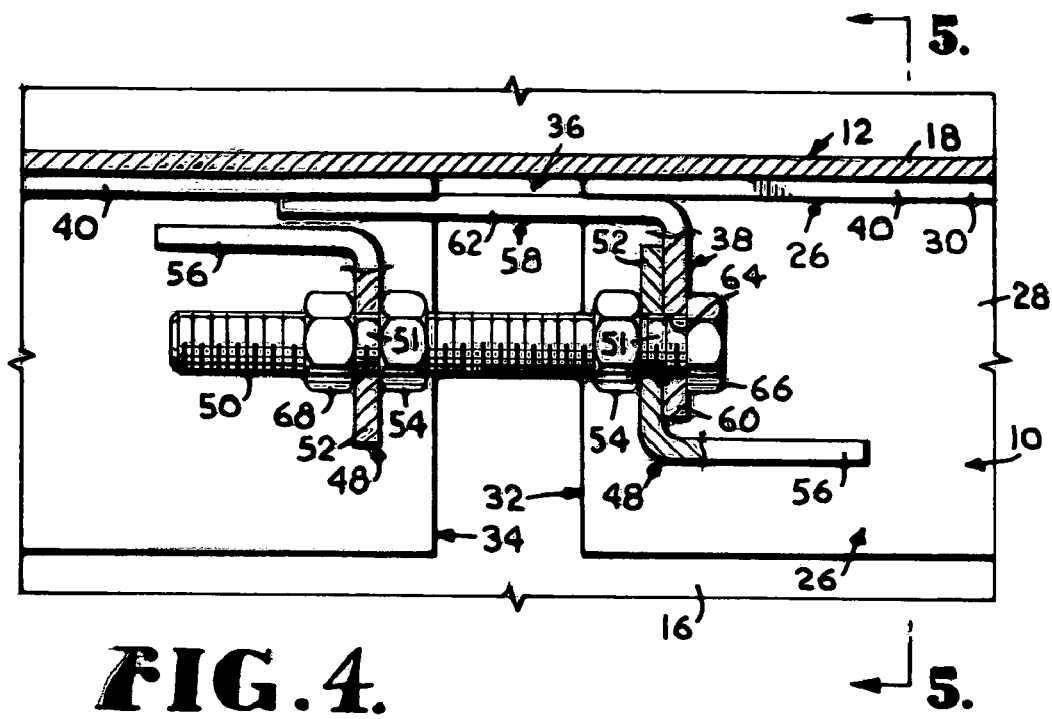
FIG. 4 is a fragmentary side elevation view of the column showing the expansion mechanism of the present invention on an enlarged scale from that shown in FIG. 3.

Turning now to the drawings in greater detail and initially to FIGS. 1 and 2, a mass transfer column is represented broadly by the numeral 10 and includes a plurality of vapor-liquid contact trays 12 supported in vertically spaced apart relation within an open internal region 14 defined by an external cylindrical shell 16. Column 10 is of the type in which mass transfer and/or heat exchange occurs between fluid streams flowing within the internal region 14 of the column 10. A common use of such columns is to effect mass transfer between one or more downwardly flowing liquid streams and one or more ascending vapor streams. Alternatively, the fluid streams can both be liquid streams or a gas stream and a liquid stream. The trays 12 are used to facilitate contact between the fluid streams as they flow within the column 10.

The fluid streams are directed to the column 10 through any suitable number of feed lines (not shown) positioned at appropriate locations along the height of the column 10. One or more vapor streams can also be generated within the column 10 rather than being introduced into the column 10 through one of the feed lines. Column 10 will also typically include an overhead line for removing a vapor product or byproduct and a bottom stream takeoff line for removing a liquid product or byproduct from the column 10. The various feed and removal lines, as well as other column components that are typically present, such as reflux stream lines, reboilers, condensers, vapor horns and the like, are not shown in the drawings because they are conventional in nature and their illustration is not believed to be necessary for an understanding of the present invention.

Trays 12 are likewise of conventional construction and comprise a tray deck 18 above which vapor-liquid interaction occurs and one or more downcomers 20 that convey liquid from the tray deck 18 to an underlying tray 12. The tray deck 18 includes a plurality of vapor passages 22 that allow vapor to rise upwardly through the tray deck 18 to intermix with liquid flowing across the top surface of the tray deck 18. The vapor passages 22 can be of various forms, such as sieve holes and fixed and movable valves. The downcomers 20 include two side downcomers that extend downwardly at opposite ends of the tray deck 18 and three intermediate downcomers equally spaced between the side downcomers. The number and specific construction of the downcomers 20 can be varied as desired for particular applications.

Turning now to FIG. 3, a support ring 24 is welded or otherwise secured to the column shell 16 and supports a peripheral edge of one of the trays 12. In one embodiment, the support ring 24 extends in a continuous, uninterrupted manner around the inner circumference of the shell 16. Alternatively, the support ring 24 can be formed of a number of segments that lie in a common plane and are spaced apart so that they do not extend through the area occupied by one or more of the downcomers 20. In this manner, the support ring 24 does not interfere with the flow of fluid through the downcomers 20.

In accordance with the present invention, at least one of the trays 12 is supported by an expansion ring 26 that is also supported by the support ring 24 welded to the column shell. A plurality of vertical pedestals or rods 27 are secured to and extend between the support ring 24 and expansion ring 26 to transfer the load carried by the expansion ring 26 to the support ring 24. The number, size and spacing between the rods 27 is determined by the load that must be transferred from the expansion ring 26 to the support ring 24. The rods 27 in one embodiment are of a cylindrical configuration, but they can alternatively be of other configurations. For example, the rods 27 can be formed from flat stock that is bent into a V-shaped cross section. Preferably, the rods 27 are positioned near the column shell 16 in the spacing between the peripheral edge of the tray 12 and the column shell 16 so that cutouts do not have to be provided in the edge of the tray 12 to accommodate the rods 27. Normally, the expansion ring 26 and associated tray 12 overlie the welded support ring 24 that carries the load transferred by the rods 27. Alternatively, the expansion ring 26 may underlie the support ring 24 that carries the load. It is also to be understood that the single welded support ring 24 can support multiple expansion rings 26 for multiple overlying and/or underlying trays 12.

The expansion ring 26 is circular in plan view and has an inverted L-shape when viewed in vertical cross section. The inverted L-shape of the expansion ring 26 is formed by an upright portion 28 and a tray support flange 30 that is integral with and extends radially inwardly from an upper edge of the upright portion 28. The expansion ring 26 has at least two facing end segments 32 and 34 formed by an expansion cutout 36 in the expansion ring 26. An expander 38 is associated with the end segments 32 and 34 and is operated in the manner described below to force apart the end segments 32 and 34 to cause an increase in the circumference of the expansion ring 26 and thereby seal the expansion ring 26 tightly against the inner surface of the column shell 16. It will be appreciated that the number of expansion cutouts 36 and expanders 38 utilized in the expansion ring 26 can be varied to suit particular installation requirements. For example, as shown in FIG. 6, a single expansion cutout 36 and expander 38 are utilized. In other applications, such as illustrated in FIGS. 2 and 3, the expansion ring 26 is divided into multiple ring segments 40 with the expansion cutout 36 and expander 38 being provided at an intermediate location within each ring segment 40. Opposed ends 42 and 44 of each ring segment 40 abut a structural component such as vertically extending bolting bars 46 that are welded to the column shell 16 and are used to support the downcorners 20.

As is best shown in FIG. 4, the expander 38 comprises L-shaped brackets 48 that are welded or otherwise secured to the end segments 32 and 34 of the expansion ring 26 and a threaded member 50 in the form of a bolt or threaded stud that extends horizontally through holes 51 formed in a vertical leg 52 of each bracket 48. The threaded member 50 carries a pair of nuts 54 that are positioned to be independently turned in opposite directions against the facing faces of the vertical legs 52 of brackets 48. Turning of the nuts 54 in this manner causes an expansion force to be exerted on the brackets 48, which in turn causes the gap formed by the cutout 36 to widen, thereby increasing the circumference of the expansion ring 26 or ring segment 40. The increase in circumference of the expansion ring 26 or ring segment 40 causes the expansion ring 26 or ring segment 40 to seal against the inner surface of the shell 16 to block or impede the flow of fluids between the expansion ring 26 and shell 16.

The L-shaped brackets 48 are mounted to the radially inner face of the upright portion 28 of the expansion ring 26 and are oriented so that the vertical legs 52 of the brackets 48 are spaced slightly from the cutout 36 and a horizontal leg 56 of each bracket 48 extends away from the cutout 36. The horizontal legs 56 of adjacent brackets 48 not only extend in opposite directions but are also positioned at opposite ends of the vertical legs 52 to which they are connected. As can best be seen in FIG. 3, each ring segment 40 also carries a second bracket 48 positioned at the opposite end 42 or 44 of the ring segment 40 from the end segment 32 or 34. The brackets 48 at the opposite ends of each ring segment 40 are oriented such that their horizontal legs 56 extend toward each other and are positioned at opposite ends of the vertical legs 52 to which they are attached. By positioning the brackets 48 in this manner, the ring segments 40 that are joined together by the expander 38 can be interchanged in left to right positioning during installation. Installation of the ring segments 40 can thus proceed more quickly because the installer does not need to be concerned with determining the correct end-to-end positioning of the ring segments 40.

Figure 5:
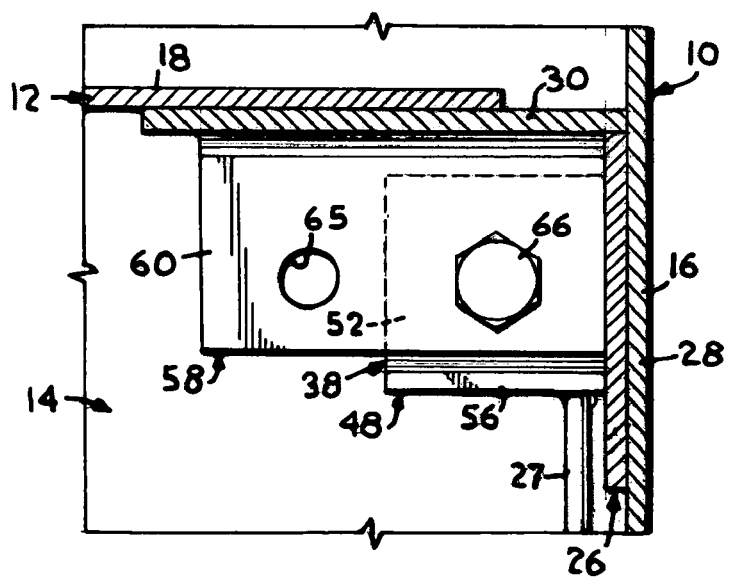
FIG. 5 is an end elevation of the expansion mechanism taken in vertical section along line 5—5 of FIG. 4 in the direction of the arrows.

Turning to FIGS. 4 and 5, the upper end of each bracket 48 is also spaced sufficiently below the tray support flange 30 to accommodate a seal plate 58 that functions to block the gap that the cutout 36 creates in the tray support flange 30 of the expansion ring 26. The seal plate 58 is generally L-shaped and comprises a mounting portion 60 interconnected with a perpendicularly extending seal portion 62. The mounting portion 60 includes a pair of side-by-side holes 64 and 65 that are sized for allowing the threaded member 50 to be inserted through one of the selected holes 64 or 65. When the seal plate 58 is mounted on the threaded member 50, an upper face of the seal portion 62 abuts the undersurface of the tray support flange 30 and a radially outer edge of the seal portion abuts the inner face of the upright leg 28 of the expansion ring 26. The seal portion 62 extends horizontally a sufficient distance to completely span the gap created by the cutout 36 in the tray support flange 30 to seal against passage of fluid through the cutout 36.

The seal plate 58 can be reversibly mounted to the threaded member 50 in multiple positions along the length of the threaded member 50. The first position is illustrated in FIG. 4 where the mounting portion 60 is positioned between a bolt head 66 of the threaded member 50 and one face of the vertical leg 52 of bracket 48. In a second position, the mounting portion 60 of the seal plate 58 can be positioned between the opposite face of the vertical leg 52 of bracket 48 and the adjacent nut 54. In both the first and second positions, the seal portion 62 of the seal plate 58 extends in a first direction to cover the cutout 36. Alternatively, in a third position, the seal plate 58 can be reversed and mounted between the other nut 54 adjacent the cutout 36 and the adjacent face of the vertical leg 52 of the other bracket 48. In this third position, the threaded member extends through the other hole 65 and the seal portion 62 of the seal plate 58 extends in an opposite direction to cover the cutout 36. Because the seal plate 58 can be installed in multiple positions on the threaded member 50, installation of the seal plate 58 can proceed quickly and easily. It will be appreciated that the presence of the bolt head 66 is necessary only when the seal plate 58 is mounted in the first position.

Similarly, a nut 68 positioned at an opposite end of the threaded member 50 is optional and can be omitted if desired.

The side by side positioning of the holes 64 in seal plate 58 allows the threaded member 50 to be located close to the column shell 16 to lessen the moment arm created by the expander 38 during expansion of the ring 26. In this manner, a large force can be exerted on the brackets 48 by turning the nuts 54 to cause the expansion ring 26 to tightly seal against the shell 16 without causing deformation of the brackets 48. Each expander 38 also allows a large range of expansion of the circumference of the expansion ring 26, while the seal plate 58 closes the gap in the cutout 36 that would otherwise permit undesired passage of fluid.

Supporting the vapor-liquid contact tray 12 according to the present invention is accomplished by positioning the one or more ring segments 40 of the expansion ring 26 underneath one of the vapor-liquid contact trays 12. At least one expander 38 is attached to the two facing end segments 32 and 34 of the expansion ring 26 by inserting the threaded member 50 through holes 51 in the vertical legs 52 of the brackets 48 that secured to the end segments 32 and 34. Nuts 54 on the threaded member 50 are turned away from each other and bear against the facing surfaces of the vertical legs 52 of the brackets 48 to widen the expansion ring 26. This increase in circumference of the expansion ring 26 causes the expansion ring 26 to seal against the inner surface of the column shell 16. The expansion of the expansion ring 26 causes an increase in the size of the cutout 36 in the expansion ring 26. The seal plate 58 positioned on the threaded member 50 blocks the cutout 36 and impedes fluid passage through the cutout 36.

The expansion ring 26 is supported by the support ring 24 that is positioned above or beneath the expansion ring 26 and is secured to the column shell 16. The vertical rods 27 extend between and are fixed to the support ring 24 and the expansion ring 26 to transfer the load carried by the expansion ring 26 to the support ring 24.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and within the scope of the invention.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A mass transfer column comprising:
   an external shell having an inner surface and defining an open internal region;
   at least one vapor-liquid contact tray disposed within the open internal region of the column;
   an expansion ring underlying said at least one vapor-liquid contact tray,
   the expansion ring having a first end segment and a second end segment defining a cutout in the expansion ring, said expansion ring having an upright leg and a tray support flange extending radially inwardly at an upper end of said upright leg, said tray support flange providing a support surface for said vapor-liquid contact tray;
   at least one support ring underlying the at least one vapor-liquid contact tray and secured to said column shell and a plurality of rods extending between said one support ring and said expansion ring to transfer a load carried by said expansion ring to said one support ring;
   an expander associated with said first and second end segments of the expansion ring,
   the expander comprising a first bracket secured to the first end segment and a second bracket secured to the second end segment, a threaded member extending through said first and second brackets, and a pair of nuts carried on said threaded member and turnable against said first and second brackets to force said first and second end segments further apart to cause the expansion ring to expand against the inner surface of said column shell; and
   at least one seal plate carried by said threaded member and positioned to block said cutout in the tray support flange of said expansion ring.

2. The column of claim 1, wherein the expansion ring is divided into multiple ring segments defining more than one of said cutouts and wherein one of said expanders is associated with at least some of said cutouts.

3. The column of claim 1, wherein the first bracket comprises a vertical leg and a horizontal leg and said second bracket comprises a vertical leg and a horizontal leg and wherein said threaded member extends through holes in said vertical legs of the first and second brackets.

4. The column of claim 3, wherein said horizontal legs of said first and second brackets extend away from each other at opposite ends of said vertical legs.

5. The column of claim 4, wherein said seal plate is generally L-shaped and comprises a mounting portion carried by said threaded member and a seal portion covering said cutout in the tray support flange of said expansion ring.

6. The column of claim 2, wherein in a plurality of said ring segments each of said ring segments has one of said first brackets at one end of the ring segment and one of said second brackets at an opposite end of the ring segment and wherein the horizontal legs of the first and second brackets on said ring segment extend in opposite directions at opposite ends of said vertical legs.

7. The column of claim 1, wherein said support ring is positioned below said expansion ring.

8. The column of claim 1, wherein said support ring is positioned above said expansion ring.

9. The column of claim 5, wherein said seal plate includes spaced apart holes in said mounting portion to allow said seal plate to be reversibly carried on said threaded member.

10. An expansion ring positionable within a mass transfer column to support a vapor-liquid contact tray within an open internal region defined by an inner surface of a shell of the column, said expansion ring comprising:
    an upright leg and a tray support flange extending radially inwardly at an upper end of said upright leg to provide a support surface for said vapor-liquid contact tray when positioned within said column;
    a first end segment and a second end segment defining a cutout in the expansion ring;
    an expander associated with said first and second end segments, said expander comprising a first bracket secured to the first end segment and a second bracket secured to the second segment, a threaded member extending through said first and second brackets, and a pair of nuts carried on said threaded member and turnable against said first and second brackets to force said first and second end segments further apart to cause the expansion ring to expand against the inner surface of said column shell; and seal plate positionable on said threaded member to block said cutout in the tray support flange of the expansion ring.

11. The expansion ring of claim 10, wherein the first bracket comprises a vertical leg and a horizontal leg and said second bracket comprises a vertical leg and a horizontal leg and wherein said threaded member extends through holes in said vertical legs of the first and second brackets.

12. The expansion ring of claim 11, wherein said horizontal legs of said first and second brackets extend away from each other at opposite ends of said vertical legs.

13. The expansion ring of claim 12, wherein said seal plate is generally L-shaped and comprises a mounting portion carried by said threaded member and a seal portion covering said cutout in the tray support flange.

14. The expansion ring of claim 13, wherein the expansion ring is divided into multiple ring segments defining more than one of said cutouts and wherein one of said expanders is associated with at least some of said cutouts.

15. The expansion ring of claim 14, wherein in a plurality of said ring segments each of said ring segments has one of said first brackets at one end of the ring segment and one of said second brackets at an opposite end of the ring segment and wherein the horizontal legs of the first and second brackets on said ring segment extend in opposite directions at opposite ends of said vertical legs.

16. The expansion ring of claim 14, wherein said seal plate includes spaced apart holes in said mounting portion to allow said seal plate to be reversibly carried on said threaded member.

17. A method of supporting a vapor-liquid contact tray in a mass transfer column, the mass transfer column having an external shell having an inner surface defining an open internal region, the method comprising:

positioning at least one expansion ring underneath said vapor-liquid contact tray, said expansion ring having first and second ends defining an cutout in the expansion ring;

attaching at least one expander to said first and second ends of the expansion ring, said expander comprising a first bracket attached to said first end a second bracket attached to said second end segment, a threaded member extending through said first and second brackets;

forcing said first and second ends apart using said expander to expand said expansion ring against the inner surface of said column shell; and blocking a horizontal portion of said cutout in the expansion ring using a seal plate carried by said threaded member.

18. The method of claim 17, further comprising:
turning nuts carried on said threaded member against said first and second brackets to cause said forcing of said first and second ends apart.

19. The method of claim 17, further comprising:
vertically spacing said expansion ring from a support ring secured to the inner surface of the column shell and securing opposite ends of a plurality of pedestals to the support ring and the expansion ring to transfer a load carried by the expansion ring to the support ring.

* * * * *